United States Patent

Erdtmann et al.

[11] Patent Number: 6,074,057
[45] Date of Patent: Jun. 13, 2000

[54] PIGMENTED INK JET INKS AND RECORDING ELEMENTS CONTAINING HARDENING AGENTS

[75] Inventors: David Erdtmann; Charles E. Romano, both of Rochester, N.Y.

[73] Assignee: Eastman Kodak Company, Rochester, N.Y.

[21] Appl. No.: 09/083,668

[22] Filed: May 22, 1998

[51] Int. Cl.$^7$ ........................................... B41J 2/01
[52] U.S. Cl. ............................................. 347/105; 347/106
[58] Field of Search .................................... 347/101, 105, 347/106; 106/31.13, 31.6, 31.83

[56] References Cited

U.S. PATENT DOCUMENTS

| | | | |
|---|---|---|---|
| 2,059,817 | 11/1936 | Sheppard et al. | 430/621 |
| 2,992,109 | 7/1961 | Allen | 430/623 |
| 2,994,611 | 8/1961 | Heyna et al. | 430/622 |
| 3,232,763 | 2/1966 | Burness | 430/623 |
| 3,304,179 | 2/1967 | Field et al. | 430/418 |
| 3,360,372 | 12/1967 | Burness et al. | 430/621 |
| 3,490,911 | 1/1970 | Burness et al. | 430/543 |
| 3,565,632 | 2/1971 | Mills et al. | 347/100 |
| 3,635,718 | 1/1972 | Froehlich et al. | 524/388 |
| 3,640,720 | 2/1972 | Cohen | 347/100 |
| 3,642,486 | 2/1972 | Burness et al. | 430/621 |
| 3,689,724 | 9/1972 | Labude | 200/330 |
| 3,762,926 | 10/1973 | Himmelmann et al. | 430/622 |
| 4,597,794 | 7/1986 | Ohta et al. | 430/622 |
| 5,085,698 | 2/1992 | Ma et al. | 430/622 |
| 5,172,133 | 12/1992 | Suga et al. | 430/621 |
| 5,474,843 | 12/1995 | Lambert et al. | 347/105 X |
| 5,853,470 | 12/1998 | Martin et al. | 106/31.86 |

OTHER PUBLICATIONS

The Theory of the Photographic Process, 4th Ed., T.H. James, 1977 Macmillan Publishing Co. pp. 77–87.
Research Disclosure, vol. 365, Sep. 1994, Item 36544, II, B. Hardeners.

*Primary Examiner*—Susan S. Y. Lee
*Assistant Examiner*—Hoan Tran
*Attorney, Agent, or Firm*—Harold E. Cole

[57] ABSTRACT

An ink jet ink/receiver set that provides images with improved durability, the set having: a) an ink receiving layer on a support, the ink receiving layer containing a hardener; and deposited thereon b) an image formed from an ink jet ink containing a carrier, a pigment, and a hardener that is the same or different from the hardener in the ink receiving layer.

10 Claims, No Drawings

6,074,057

PIGMENTED INK JET INKS AND RECORDING ELEMENTS CONTAINING HARDENING AGENTS

FIELD OF THE INVENTION

This invention relates to methods and formulations that improve the performance of aqueous inks which utilize pigments as colorants and which are useful for ink jet printing applications. Specifically, this invention relates to incorporating hardeners into pigmented inks and also into ink-receiving layers (IRL's).

BACKGROUND OF THE INVENTION

The ink formulations and methods employed in ink jet imaging involve the application of liquid ink droplets in a pixel-by-pixel manner to an ink-receiving element. There are numerous schemes that may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to the ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation.

The inks used in the various ink jet printers can be classified as either dye-based or pigment-based. A dye is a colorant, which is molecularly dispersed or solvated by the carrier medium. The carrier medium can be a liquid or a solid at room temperature. A commonly used carrier medium is water or a mixture of water and organic cosolvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor lightfastness. When water is used as the carrier medium, such inks also generally suffer from poor waterfastness.

Pigment-based inks have been gaining in popularity as a means of addressing these limitations. In pigment-based inks, the colorant exists as discrete particles. These pigment particles are usually treated with addenda known as dispersants or stabilizers, which serve to keep the pigment particles from agglomerating and/or settling out. Pigment-based inks suffer from a different set of deficiencies than dye-based inks. One deficiency is related to the observation that pigment-based inks interact differently with specially coated papers and films, such as the transparent films used for overhead projection and the glossy papers and opaque white films used for high quality graphics and pictorial output. In particular, it has been observed that pigment-based inks produce imaged areas that are entirely on the surface of coated papers and films. This results in images which have poor dry and wet adhesion properties, resulting in images which can be easily smudged.

Commonly owned U.S. patent application Ser. No. 08/847,858, filed Apr. 28, 1997, entitled "Pigmented Ink Jet Inks Containing Aldehydes" of Martin et al., and U.S. patent application Ser. No. 08/896,520 filed Apr. 28, 1997, entitled "Pigmented Ink Jet Inks Containing Olefins" of Martin et al., disclose ink jet ink formulations containing compounds with aldehyde, blocked aldehyde and active olefinic functional groups. However, these references do not teach or even mention a method of treating ink-receiving layers (IRL's) to improve waterfastness of the image.

SUMMARY OF THE INVENTION

The present invention discloses improved waterfastness, wet adhesion, and image quality on gelatin and cross-linkable polymeric coated papers and films when a pigmented ink contains one or more hardeners, and when the ink receiving layer also contains one or more hardener. Hardening agents are defined as any additive which causes chemical cross-linking.

The present invention discloses an ink/receiver set that provides images with improved durability, said set comprising:

a) an ink receiving layer on a support, the ink receiving layer containing a hardener; and deposited thereon b) an image formed from an ink jet ink containing a carrier, a pigment, and a hardener that is the same or different from the hardener in the ink receiving layer.

Also provided is a method of preparing ink jet ink images with improved durability comprising the steps of:

a) providing an ink jet ink containing a carrier, a pigment, and a hardener;

b) providing an ink receiving layer on a support; said ink receiving layer containing a hardener that is the same or different from the hardener in the ink; and c) image-wise depositing the ink on the ink receiving layer.

This process offers an advantage over incorporating the additives into the inks only in that by incorporating the additives into the receiver hardening is obtained in both imaged and non-imaged areas. Furthermore, the amount of hardener can be precisely controlled and distributed in a uniform fashion independent of ink laydown. The addition of one or more hardeners to the ink-receiving-layer cross-links the coating. The printing of pigmented inks containing hardeners made on the cross-linked receiver improves the adhesion of the pigment to the ink-receiving layer. This method produces images which have excellent waterfastness and wet adhesion properties. If the ink-receiving layer is not cross-linked prior to printing with pigmented inks containing hardener, the coating may not be fully hardened throughout the image and poor wet adhesion may be observed in low density areas of the image.

DETAILED DESCRIPTION OF THE INVENTION

This invention relates to ink jet receivers and pigmented inks used in combination, each containing one or more hardeners, thus producing excellent waterfastness and wet adhesion properties. The hardeners in the ink-receiving layer may include inorganic and organic hardeners, and combinations of inorganic and organic hardeners. The hardeners in the pigmented ink may contain one or more organic compounds.

Preferred hardeners include formaldehyde and compounds that contain two or more aldehyde functional groups such as glyoxal, gluteraldehyde and the like. Other preferred hardeners include compounds that contain blocked aldehyde functional groups such as aldehydes of the type tetrahydro-4-hydroxy-5-methyl-2(1H)-pyrimidinone polymers (Sequa SUNREZ® 700), polymers of the type having a glyoxal polyol reaction product consisting of 1 anhydroglucose unit:

2 glyoxal units (SEQUAREZ® 755 obtained from Sequa Chemicals, Inc.), dimethoxy ethanel-melamine non-fomaldehyde resins such as Sequa CPD3046-76 obtained from Sequa Chemicals Inc., 2,3-dihydroxy-1,4-dioxane (DHD), and the like. Blocked hardeners are substances, usually derived from the active hardener, that release the active compound under appropriate conditions (The Theory of the Photographic Process, $4^{th}$ Edition, T. H. James, 1977, Macmillan Publishing CO., page 81). All are employed at concentrations ranging from 0.10 to 5.0 weight percent of active ingredients in the pigmented ink and/or in the ink-receiving layer.

Other preferred hardeners are compounds that contain active olefinic functional groups such as bis-(vinylsulfonyl)-methane (BVSM), bis-(vinylsulfonylmethyl)ether (BVSME), 1,3,5-triacryloylhexahydro-s-triazine, and the like. In the context of the present invention, active olefinic compounds are defined as compounds having two or more olefinic bonds, especially unsubstituted vinyl groups, activated by adjacent electron withdrawing groups (The Theory of the Photographic Process, $4^{th}$ Edition, T. H. James, 1977, Macmillan Publishing Co., page 82). All are employed at concentrations ranging from 0.10 to 5.0 weight percent of active ingredients in the pigmented ink and/or in the ink-receiving layer.

Still other preferred additives are inorganic hardeners such as aluminum salts, especially the sulfate, potassium and ammonium alums, ammonium zirconium carbonate, chromium salts such as chromium sulfate and chromium alum, and salts of titanium dioxide, zirconium dioxide, and the like. All are employed at concentrations ranging from 0.10 to 5.0 weight percent of active ingredients in the ink-receiving layer. Inorganic hardeners are preferably used in gelatin receivers.

Combinations of organic and inorganic hardeners may also be used. Most preferred is the combination of chrome alum (chromium(III) potassium sulfate dodecahydrate) or aluminum sulfate and 2,3-dihydroxy-1,4-dioxane (DHD) at total hardener concentrations ranging from 0.10 to 5.0 wt %. Most preferred is the combination of aluminum sulfate and 2,3-dihydroxy-1,4-dioxane (DHD) having a total hardener concentration ranging between 0.25 and 2.0 weight percent of active ingredients in the ink-receiving layer.

Besides the hardener, the ink-receiving layer may contain varying levels of matting agents for the purpose of controlling gloss, friction, and/or fingerprint resistance, surfactant (s) to improve coatability and to adjust the surface tension of the dried coating, anti-oxidants, UV absorbing compounds, light stabilizers, and the like.

Inks useful for ink jet recording processes generally comprise at least a mixture of a solvent and a colorant. The preferred solvent is de-ionized water, and the colorant is either a pigment or a dye. Pigments are often preferred over dyes because they generally offer improved waterfastness and lightfastness on plain paper.

Pigmented inks are most commonly prepared in two steps:
1. a pigment milling step in which the as-received pigment is deaggregated into its primary particle size, and
2. a dilution step in which the pigment mill grind is converted into a useable ink.

Processes for preparing pigmented ink jet inks involve blending the pigment, an additive known as a stabilizer or dispersant, a liquid carrier medium, grinding media, and other optional addenda such as surfactants and defoamers. This pigment slurry is then milled using any of a variety of hardware such as ball mills, media mills, high-speed dispersers, and roll mills.

In the practice of the present invention, any of the known pigments can be used. The exact choice of pigment will depend upon the specific color reproduction and image stability requirements of the printer and application. For a list of pigments useful in ink jet inks, see U.S. Pat. No. 5,085,698, column 7, line 10 through column 8, line 48.

The liquid carrier medium can also vary widely and again will depend on the nature of the ink jet printer for which the inks are intended. For printers which use aqueous inks, water, or a mixture of water with miscible organic co-solvents, is the preferred carrier medium.

The dispersant is another important ingredient in the mill grind. Although there are many known dispersants known in the art, the best dispersant will be a function of the carrier medium and often varies from pigment to pigment. Preferred dispersants for aqueous ink jet inks include sodium dodecyl sulfate, acrylic and styrene-acrylic copolymers, such as those disclosed in U.S. Pat. Nos. 5,085,698 and 5,172,133, and sulfonated styrenics, such as those disclosed in U.S. Pat. No. 4,597,794. Our most preferred dispersants are salts of oleyl methyl tauride.

In the dilution step, other ingredients are also commonly added to pigmented ink jet inks. Cosolvents (0–20 wt %) are added to help prevent the ink from drying out or crusting in the orifices of the printhead or to help the ink penetrate the receiving substrate, especially when the substrate is a highly sized paper. Preferred cosolvents for the inks of the present invention are glycerol, ethylene glycol, propylene, 2-methyl-2,4-pentandiol, diethylene glycol, and mixtures thereof, at overall concentrations ranging from 5 to 20 wt %.

A biocide (0.0001–1.0 wt %) may be added to prevent unwanted microbial growth, which may occur in the ink over time. A preferred biocide for the inks of the present invention is Proxel GXL™ (1,2-benzisothiozolin-3-one, obtained from Zeneca Colours) at a final concentration of 0.005–0.5 wt %.

Additional additives, which may optionally be present in ink jet inks, include thickeners, conductivity enhancing agents, anti-kogation agents, drying agents, and defoamers.

In the context of the present invention, the pigmented ink may contain one or more hardeners. The ink-receiving layer may also include one or more hardeners that cross-link the ink-receiving layer. The combination of adding hardeners to both the pigmented ink and to the ink-receiving layer results in images with excellent waterfastness, wet adhesion, and image quality properties.

Besides those already listed above, it is contemplated that other aldehyde containing compounds that are effective hardeners are also useful in the practice of this invention. Some compounds known to be effective hardeners are 3-hydroxybutyraldehyde (U.S. Pat. No. 2,059,817), crotonaldehyde, the homologous series of dialdehydes ranging from glyoxal to adipaldehyde, diglycolaldehyde (U.S. Pat. No. 3,304,179) various aromatic dialdehydes (U.S. Pat. No. 3,565,632 and U.S. Pat. No. 3,762,926), and polymeric dialdehydes such as dialdehyde starch and dialdehyde derivatives of plant gums. Most preferred are formaldehyde, glutaraldehyde, succinaldehyde, and glyoxal at concentrations ranging from 0.10 to 5.0 weight percent of active ingredients in the pigmented ink and/or in the ink-receiving layer.

Likewise, it is also contemplated that other hardeners may be useful in the context of this invention. Some compounds known to be effective hardeners are blocked aldehydes such as 2,3-dihydroxy-1,4-dioxane (DHD) and its derivatives, acetates of the dialdehydes and hemiacetals, various bisulfite adducts, 2,5-dimethoxytetrahydrofuran, and N-methylol compounds obtained from the condensation of formaldehyde with various aliphatic or cyclic amides, ureas, or nitrogen heterocycles. Most preferred is 2,3-dihydroxy-1,4-dioxane (DHD) at concentrations ranging from 0.10 to 5.0 weight percent of active ingredients in the pigmented ink and/or in the ink-receiving layer.

It is contemplated that compounds with active olefinic functionality, that are effective hardeners are also useful in the practice of this invention. Some compounds known to be effective hardeners are divinyl ketone, resorcinol bis(vinylsulfonate) (U.S. Pat. No. 3,689,274), 4,6-bis(vinylsulfonyl)-m-xylene (U.S. Pat. No. 2,994,611), bis(vinylsulfonylalkyl)ethers and amines (U.S. Pat. No. 3,642,486 and U.S. Pat. No. 3,490,911), 1,3,5-tris(vinylsulfonyl) hexahydro-s-triazine, diacrylamide (U.S. Pat. No. 3,635,718), 1,3-bis(acryloyl)urea (U.S. Pat. No. 3,640,720), N,N'-bismaleimides (U.S. Pat. No. 2,992,109) bisisomaleimides (U.S. Pat. No. 3,232,763), bis(2-acetoxyethyl)ketone (U.S. Pat. No. 3,360,372), and 1,3,5-triacryloylhexahydro-s-triazine. Blocked active olefins of the type bis(2-acetoxyethyl)ketone and 3,8-dioxodecane-1,10-bis (pyridinium perchlorate) may also be used. Most preferred is BVSM and BVSME at concentrations ranging from 0.10 to 5.0 weight percent of active ingredients in the pigmented ink and/or in the ink-receiving layer.

It is further contemplated that other inorganic hardeners that are effective hardeners are also useful in the practice of this invention. Some compounds known to be effective hardeners include zirconium and titanium salts, chromium salts such as chromium sulfate and chromium alum, and aluminum salts, especially the sulfate potassium and ammonium alums. Most preferred is aluminum sulfate at concentrations ranging from 0.10 to 5.0 weight percent of active ingredient in the ink-receiving layer.

Other compounds which may act as hardeners include: acetylenes, azides, aziridines, carboxylic acid derivatives such as anhydrides, activated esters, and imido esters, epoxides such as glycidyl ethers and glycidylammonium salts, active halogen compounds, isocyanate adducts, diketones, methylol Melamines, oxazolines, organometallics such as Volan™ (a complex of methacrylic acid and chromium III chloride) peptide bond forming agents such as carbodiimides, isoxazoliumsalts, N-Carbamoylpyridinium salts, and 4-Amino-1-methylsulfonylpyridinium salts, sulfonate esters, s-Triazines, mucochloric acid, and polymeric hardeners. Some of these above listed hardeners might be better suited for one type of receiver than another. For example, they might work better with gelatin than with acetoacetylated PVA or other cross-linkable polymers. However, without undue experimentation one skilled in the art would be able to select the hardener most suited to the choice of receiver.

In addition there may be a synergistic effect from certain combinations of the above mentioned hardeners.

Additional related hardeners can be found in, The Theory of the Photographic Process, 4$^{th}$ Edition, T. H. James, 1977, Macmillan Publishing CO. pages 77–87, and in *Research Disclosure*, Vol. 365, September 1994, Item 36544, II, B. Hardeners.

It has been unexpectedly found that improved waterfastness, wet adhesion, and image quality properties on gelatin and polymeric coated papers and films can be achieved when pigmented inks containing hardeners are printed onto IRL's which also contain hardeners. Most preferred is 2,3-dihydroxy-1,4-dioxane (DHD) added to both pigmented ink and ink-receiving layer at total hardener concentrations ranging from 0.10 to 5.0 wt % in each component. As used herein, the weight percents of hardeners refer to the percent of active hardener in the total solution (ink or receiver).

EXAMPLES

Comparative Example A

| Mill Grind | |
|---|---|
| Polymeric beads, mean diameter of 50 μm (milling media) | 325.0 g |
| Quinacridone magenta P.R. 122 Manufactured by Sun Chemical | 30.0 g |
| Oleoyl methyl taurine, (OMT) sodium salt | 9.0 g |
| Deionized water | 208 g |
| Proxel GXL ™ (biocide from Zeneca) | 0.2 g |

The above components were milled using a high-energy media mill manufactured by Morehouse-Cowles Hochmeyer. The mill was run for 8 hours at room temperature. An aliquot of the above dispersion to yield 1.30 g pigment was mixed with 6.00 g diethylene glycol, and additional deionized water for a total of 50.0 g. This ink was filtered through 3-μm filter and introduced into an empty Hewlett-Packard 51626A print cartridge. Images were made with a Hewlett-Packard DeskJet™ 540 printer on medium weight resin coated paper containing an imaging layer.

The resin coated paper stock had been previously treated with a corona discharge treatment (CDT) and coated with an imaging layer consisting of about 800 mg/ft$^2$ of an acetoacetylated poly(vinylalcohol) (Gohsefimer Z-200, Nippon Gohsei).

Poor waterfastness and wet adhesion were observed throughout the image (Dmax and lower density areas). The pigmented ink image floated to the surface immediately when immersed in distilled water.

Comparative Example B

An ink was prepared and printed in the same manner as that described in Comparative Example A, except that to the pigmented ink 1.25 g of a 10% solution of 2,3-dihydroxy-1,4-dioxane (DHD) obtained from Aldrich Chemicals was added to obtain a final DHD concentration of 0.25 wt %, and additional deionized water for a total of 50 g.

Excellent waterfastness properties were measured in the 100% fill areas (99% density retention). Fair wet adhesion properties were observed in the 100% fill areas ($D_{max}$)(51% retention).

Comparative Example C

An ink was prepared and printed in the same manner as that described in Comparative Example A, except that to the pigmented ink 2.50 g of a 10% solution of 2,3-dihydroxy-1,4-dioxane (DHD) obtained from Aldrich Chemicals was added to obtain a final DHD concentration of 0.50 wt %, and additional deionized water for a total of 50 g.

Excellent waterfastness properties were measured in the 100% fill areas (100% density retention). Excellent wet adhesion properties were observed in the 100% fill areas (Dmax)(97% retention).

Comparative Example D

An ink was prepared in the same manner as that described in Comparative Example A.

Prior to coating, 0.25 weight percent of 2,3-dihydroxy-1,4-dioxane (DHD) (Aldrich Chemicals) was added to the ink-receiving layer solution. The solution was then coated and dried, resulting in a final dry laydown of approximately 800 mg/sqft of polymer and 2.0 mg/sqft of DHD.

The pigmented ink was printed as in the above examples.

Excellent waterfastness properties were observed in the 100% fill areas (99% density retention). Fair wet adhesion properties were observed in the 100% fill areas ($D_{max}$)(34% retention).

Comparative Example E

An ink was prepared in the same manner as that described in Comparative Example A. Prior to coating, 0.50 weight percent of 2,3-dihydroxy-1,4-dioxane (DHD) (Aldrich Chemicals) was added to the ink-receiving layer solution. The solution was then coated and dried, resulting in a final dry laydown of approximately 800 mg/sqft of polymer and 4.0 mg/sqft of DHD.

The pigmented ink was printed as in the above examples.

Excellent waterfastness properties were observed in the 100% fill areas (96% density retention). Fair wet adhesion properties were observed in the 100% fill areas (Dmax)(42% retention).

Comparative Example F

An ink was prepared and printed in the same manner as that described in Comparative Example A, except that to the pigmented ink 0.68 g of a 37 wt % solution of formaldehyde (FA) obtained from Aldrich Chemicals was added to the mixture to obtain a final FA concentration of 0.50 wt %, and additional deionized water for a total of 50 g.

Excellent waterfastness properties were measured in the 100% fill areas (100% density retention). Excellent wet adhesion properties were observed in the 100% fill areas (Dmax)(100% retention).

Example 1

An ink was prepared in the same manner as that described in Comparative Example B.

Prior to coating, 0.25 weight percent of 2,3-dihydroxy-1,4-dioxane (DHD) (Aldrich Chemicals) was added to the ink-receiving layer solution. The solution was then coated and dried, resulting in a final dry laydown of approximately 800 mg/sqft of polymer and 2.0 mg/sqft of DHD.

The pigmented ink was printed as in the above examples.

Excellent waterfastness properties were observed in the 100% fill areas (100% density retention). Good wet adhesion properties were observed in the 100% fill areas (Dmax) (83% retention).

Example 2

An ink was prepared in the same manner as that described in Comparative Example C.

Prior to coating, 0.25 weight percent of 2,3-dihydroxy-1,4-dioxane (DHD) (Aldrich Chemicals) was added to the ink-receiving layer solution. The solution was then coated and dried, resulting in a final dry laydown of approximately 800 mg/sqft of polymer and 2.0 mg/sqft of DHD.

The pigmented ink was printed as in the above examples.

Excellent waterfastness properties were observed in the 100% fill areas (100% density retention). Excellent wet adhesion properties were observed in the 100% fill areas (Dmax)(100% retention).

Example 3

An ink was prepared in the same manner as that described in Comparative Example B. Prior to coating, 0.50 weight percent of 2,3-dihydroxy-1,4-dioxane (DHD) (Aldrich Chemicals) was added to the ink-receiving layer solution. The solution was then coated and dried, resulting in a final dry laydown of approximately 800 mg/sqft of polymer and 4.0 mg/sqft of DHD.

The pigmented ink was printed as in the above examples.

Excellent waterfastness properties were observed in the 100% fill areas (100% density retention). Good wet adhesion properties were observed in the 100% fill areas (Dmax) (66% retention).

Example 4

An ink was prepared in the same manner as that described in Comparative Example C. Prior to coating, 0.50 weight percent of 2,3-dihydroxy-1,4-dioxane (DHD) (Aldrich Chemicals) was added to the ink-receiving layer solution. The solution was then coated and dried, resulting in a final dry laydown of approximately 800 mg/sqft of polymer and 4.0 mg/sqft of DHD.

The pigmented ink was printed as in the above examples.

Excellent waterfastness properties were observed in the 100% fill areas (100% density retention). Excellent wet adhesion properties were observed in the 100% fill areas (Dmax)(100% retention).

Example 5

An ink was prepared in the same manner as that described in Comparative Example F. Prior to coating, 0.50 weight percent of 2,3-dihydroxy-1,4-dioxane (DHD) (Aldrich Chemicals) was added to the ink-receiving layer solution. The solution was then coated and dried, resulting in a final dry laydown of approximately 800 mg/sqft of polymer and 4.0 mg/sqft of DHD.

The pigmented ink was printed as in the above examples.

Excellent waterfastness properties were observed in the 100% fill areas (100% density retention). Excellent wet adhesion properties were observed in the 100% fill areas (Dmax)(100% retention).

Ink Characterization

The images printed from the examples were evaluated by measuring the optical densities in three area patches with maximum ink coverage, and averaging, using an X-Rite™ Photographic Densitometer.

Waterfastness was determined by immersing samples of printed images in distilled water for 1 hour and then allowed to dry for at least 12 hours. The optical density was measured before immersion in water and after immersion in water and drying. Waterfastness is determined as the per cent of retained optical density in an undisturbed $D_{max}$ and mid-density (~0.60) area after immersion in water and drying.

After the samples had been immersed in water for half an hour, a portion of each patch ($D_{max}$) were physically rubbed to ascertain if the pigmented ink image would rub off with pressure (wet adhesion). Wet adhesion is determined as the percent of retained optical density in the rubbed portion relative to the original density.

The results from Comparative Examples A–F and Examples 1–5 are summarized in Table's 1 and 2.

TABLE 1

| Example | Ink Hardener/Amount (wt %) | Receiver Hardener/Amount (wt %) | $D_{max}$ Density Before Soak | Waterfastness ($D_{max}$) (% Density Retained) | Waterfastness (Mid-Density) (% Density Retained) | Wet Adhesion ($D_{max}$) (% Density Retained) |
|---|---|---|---|---|---|---|
| Comp. A | None | None | 1.74 | 0 | 0 | 0 |
| Comp. B | 0.25% DHD | None | 1.84 | 99 | 0 | 51 |
| Comp. C | 0.50% DHD | None | 1.90 | 100 | 0 | 97 |
| Comp. D | None | 0.25% DHD | 1.87 | 99 | 0 | 34 |
| Comp. E | None | 0.50% DHD | 1.93 | 96 | 0 | 42 |
| 1 | 0.25% DHD | 0.25% DHD | 1.97 | 100 | 0 | 83 |
| 2 | 0.50% DHD | 0.25% DHD | 2.03 | 100 | 85 | 100 |
| 3 | 0.25% DHD | 0.50% DHD | 2.03 | 100 | 77 | 66 |
| 4 | 0.50% DHD | 0.50% DHD | 2.05 | 100 | 93 | 100 |

TABLE 2

| Example | Ink Hardener/Amount (wt %) | Receiver Hardener/Amount (wt %) | $D_{max}$ Density Before Soak | Waterfastness ($D_{max}$) (% Density Retained) | Wet Adhesion (Mid-Density) (% Density Retained) | Wet Adhesion ($D_{max}$) (% Density Retained) |
|---|---|---|---|---|---|---|
| Comp. A | None | None | 1.74 | 0 | 0 | 0 |
| Comp. E | None | 0.50% DHD | 1.93 | 96 | 0 | 42 |
| Comp. F | 0.50% FA | None | 1.88 | 100 | 43 | 100 |
| 5 | 0.50% FA | 0.50% DHD | 2.03 | 100 | 100 | 100 |

DHD = 2,3-dihydroxy-1,4-dioxane, FA = Formaldehyde,

The results indicate that a significant enhancement of waterfastness and wet adhesion is achieved when hardener is added to a pigmented ink jet ink and to an ink-receiving layer.

The invention has been described in detail with particular reference to certain preferred embodiments thereof, but it will be understood that variations and modifications can be effected within the spirit and scope of the invention.

What is claimed is:

1. An ink jet ink/receiver set that provides images with improved durability, said set comprising:
   a) an ink receiving layer on a support, the ink receiving layer containing a hardener; and deposited thereon
   b) an image formed from an ink jet ink containing a carrier, a pigment, and a hardener that is the same or different from the hardener in the ink receiving layer, each said hardener comprising 2,3-dihydroxy-1,4-dioxane; a tetrahydro-4-hydroxy-5-methy-2(1H)-pyrimidinone polymer; a polymer having a glyoxal polyol reaction product consisting of 1 anhydroglucose unit: 2 glyoxal units; a dimethoxy ethanal-Melamine non-formaldehyde resin; a N-methylol compound obtained from the condensation of formaldehyde with an aliphatic or cyclic amide, urea, or nitrogen heterocycle; bis(vinylsulfonyl)methane; or bis(vinylsulfonylmethyl)ether.

2. The ink jet ink/receiver set of claim 1 wherein the concentration of hardener in the ink is between 0.10 and 5.0 weight percent of active ingredients in the ink.

3. The ink jet ink/receiver set of claim 2 wherein the concentration of hardener in the ink is between 0.25 and 2.0 weight percent of active ingredients in the ink.

4. The ink jet ink/receiver set of claim 1 wherein the concentration of hardener in the ink receiving layer is between 0.10 and 5.0 weight percent of active ingredients in the ink receiving layer.

5. The ink jet ink/receiver set of claim 1 wherein the concentration of hardener in the ink receiving layer is between 0.25 and 2.0 weight percent of active ingredients in the ink receiving layer.

6. The ink jet ink/receiver set of claim 1 wherein the hardener in the ink receiving layer is 2,3-dihydroxy-1,4-dioxane.

7. The ink jet ink/receiver set of claim 1 wherein the hardener in the ink receiving layer is 2,3-dihydroxy-1,4-dioxane and aluminum sulfate and the receiver is comprised of gelatin.

8. An ink jet ink receiver comprising:

a support;

on the support, an ink jet ink receiving layer containing a hardener; and on the ink receiving layer, an image formed by pigmented ink jet ink deposited thereon;

wherein the ink jet ink contains a carrier, a pigment, and a hardener that is the same or different from the hardener in the ink receiving layer, each said hardener comprising 2,3-dihydroxy-1,4-dioxane; a tetrahydro-4-hydroxy-5-methyl-2(1H)-pyrimidinone polymer; a polymer having a glyoxal polyol reaction product consisting of 1 anhydroglucose unit: 2 glyoxal units; a dimethoxy ethanal-Melamine non-formaldehyde resin; a N-methylol compound obtained from the condensation of formaldehyde with an aliphatic or cyclic amide, urea, or nitrogen heterocycle; bis(vinylsulfonyl)methane; or bis(vinylsulfonylmethyl)ether.

9. A method of preparing ink jet ink images with improved durability comprising the steps of:
   a) providing an ink jet ink containing a carrier, a pigment, and a hardener;

b) providing an ink receiving layer on a support; said ink receiving layer containing a hardener that is the same or different from the hardener in the ink; and c) image-wise depositing the ink receiving layer,
each said hardener comprising 2,3-dihydroxy-1,4-dioxane; a tetrahydro-4-hydroxy-5-methyl-2(1H)-pyrimidinone polymer; a polymer having a glyoxal polyol reaction product consisting of 1 anhydroglucose unit: 2 glyoxal units; a dimethoxy ethanal-Melamine non-formaldehyde resin; a N-methylol compound obtained from the condensation of formaldehyde with an aliphatic or cyclic amide, urea, or nitrogen heterocycle; bis(vinylsulfonyl)methane; or bis(vinylsulfonylmethyl)ether.

10. An ink jet receiving layer treated according to the method of claim 9.

* * * * *